United States Patent [19]
Chu et al.

[11] Patent Number: 5,241,493
[45] Date of Patent: Aug. 31, 1993

[54] FLOATING POINT ARITHMETIC UNIT WITH SIZE EFFICIENT PIPELINED MULTIPLY-ADD ARCHITECTURE

[75] Inventors: Tan V. Chu, Austin; Faraydon O. Karim, Round Rock; Christopher H. Olson, Austin, all of Tex.

[73] Assignee: International Business Machines Corporation, Armonk, N.Y.

[21] Appl. No.: 807,697

[22] Filed: Dec. 16, 1991

[51] Int. Cl.[5] .............................................. G06F 7/38
[52] U.S. Cl. ................................................ 364/748
[58] Field of Search .................... 364/748, 760, 750.5, 364/736

[56] References Cited

U.S. PATENT DOCUMENTS

| | | | |
|---|---|---|---|
| 4,190,894 | 2/1980 | Mudge | 364/758 |
| 4,228,520 | 10/1980 | Letteney et al. | 364/760 |
| 4,594,678 | 6/1989 | Uhlenhoff | 364/736 |
| 4,910,701 | 3/1990 | Gibbons et al. | 364/760 |
| 4,969,118 | 11/1990 | Montoye et al. | 364/748 |
| 4,996,661 | 2/1991 | Cox et al. | 364/748 |
| 4,999,802 | 3/1991 | Cocanougher et al. | 364/748 |

OTHER PUBLICATIONS

IBM Technical Disclosure Bulletin vol. 30 No. 3 Aug. 1987 "Multiply-Addition-An Ultra High Performance Dataflow", pp. 982-987.

"Computer Architecture A Quantitative Approach"-David A. Patterson, John L. Hennessy, 1990, pp. A-42 to A-49.

Primary Examiner—Long T. Nguyen
Attorney, Agent, or Firm—Casimer K. Salys

[57] ABSTRACT

An architecture and method relating to a floating point operation which performs the mathematical computation of $A*B+C$. The multiplication is accomplished in two or more stages, each stage involving corresponding sets of partial products and concurrently accomplished incremental summations. A pipelined architecture provides for the summation of the least significant bits of an intermediate product with operand C at a stage preceding entry into a full adder. Thereby, a significant portion of the full adder can be replaced by a simpler and smaller incrementer circuit. Partitioning of the multiplication operation into two or more partial product operations proportionally reduces the size of the multiplier required. Pipelining and concurrence execution of multiplication and addition operation in the multiplier provides in two cycles the results of the mathematical operation $A*B+C$ while using a full adder of three-quarters normal size.

13 Claims, 3 Drawing Sheets

(OPERANDS MUST BE ALIGNED BEFORE ADDITION)

FLOATING POINT ARITHMETIC UNIT WITH SIZE EFFICIENT PIPELINED MULTIPLY-ADD ARCHITECTURE

BACKGROUND OF THE INVENTION

This invention relates generally to data processing systems and more specifically to the architecture and method of using an efficiently configured floating point arithmetic unit.

A variety of architectures are known and in use for performing floating point calculations in digital computers. Given the complexity of floating point calculations and the sizes of typical operands, where for scientific applications mantissas nominally are composed of greater than 50 bits, there exists an acute need for an architecture which retains the scientific precision yet reduces the circuit complexity. This is particularly true in the competitive market of workstations where computer designers strive to provide the workstation user with the greatest degree of computational capability while minimizing the cost and size of the hardware.

The classical floating point arithmetic operation to which the present invention is directed involves, in succession, the multiplication of two operands followed by the addition of the resultant with a third operand, mathematically described as A*B+C. The significance of this mathematical computation can be gleaned from the discussion in U.S. Pat. No. 4,969,118. Though highly flexible in usage, the mathematical operation of A*B+C exacts a significant toll as far as circuit complexity when implemented in a conventional architecture. The problems arises from the fact the final stage adder must be capable of handling a full 3N bits to ensure that the outcome retains the precision attributed to the individual N bit operands. Thus for our representative 50 bit operand, the full adder must be capable of handling greater than 150 bits. An example of such an architecture appears in U.S. Pat. No. 4,999,802.

A full adder with resources to provide an output a bit count in the range of 150 is very large and will therefore likely consume a significant portion of any integrated circuit chip upon which it resides. The architecture in U.S. Pat. No. 4,999,802 is made more efficient by selectively pipelining operations to improve the overall performance of the floating point arithmetic unit in situations where the results of the first operation are determined to be operands in a successive operation.

One floating point architecture refinement which reduces the size of the full adder uses an incrementer for the upper third most significant bits. Examples of such configurations appear in U.S. Pat. No. 4,969,118 and IBM Technical Disclosure Bulletin, Volume 30, No. 3, August 1987, pages 982-987. Thus, an incrementer of size N reduces the size of the full adder in a proportional amount, leaving the adder to be 2N for N size operands in the calculation of A*B+C. Incrementers are known to be significantly smaller than adders, in that they merely take a carry-in signal and propagate the result to more significant the carry-out of the incrementer becomes an end around carry back to the carry-in of the adder.

The electronic devices needed to perform the multiplication stage of the arithmetic operation A*B+C are similarly complex for operands having large values of N. Contemporary high speed floating point multiplication architectures use Wallace trees, composed of carry save adders (CSAs) configured in arrays, to provide an outpoint having 2N bits for two operands individually composed of N bits. Examples of such appear in U.S. Pat. Nos. 4,969,118 and 4,999,802, as well as the aforementioned IBM Technical Disclosure Bulletin, and in the text book entitled *Computer Architecture A Quantitative Approach* by D. A. Patterson et al, Copyright 1990, Pages A-42 through A-49. There is suggestion in the text book by Patterson et al that the multiplier array could be reduced in size through the practice of multiple passes.

In the context of such teaching, there remains a need for a floating point architecture, and a related method of use, in which the full adder is further reduced in size, the multiplier arrays is reduced in size, and pipelining is implemented to overlap multiplication and addition operations.

SUMMARY OF THE INVENTION

The present invention provides an architecture for performing the floating point arithmetic operation of A*B+C, in which the mantissas of the operands are N bits, and includes circuitry for generating a first partial product using the operand A and a fraction N/M (wherein M is a whole number greater than 1) of the least significant bits of operand B, circuitry for generating a second partial product of operand A and another fraction of the bits of operand B, circuitry for summing operand C with the first partial product and providing selective bits of that result to a first incrementer suitable for receiving a fractional part of the least significant bits of the arithmetic operation, and circuitry for summing selected most significant bits from the first partial product with selected most significant bits from the second partial product in an adder capable of providing a sum composed of significantly fewer than 2N bits. In one variation, carry-out bits from the adder are provided as carry-in bits to a second incrementer, which second incrementer provides its carry-out bits as end around carry bits to the first incrementer. The invention further contemplates steps in which a first partial product is generated using operand A and the least significant bits of operand B, selected bits from the result are added to operand C for entry into a least significant bit incrementer, and selected most significant bits from the first partial product are summed with selected most significant bits from a second partial product in an adder.

In a preferred embodiment, the invention relates to a floating point arithmetic unit which performs the operation of A*B+C using a multiplier array, a reduced size adder, two incrementers, and an incrementer-to-incrementer end around carry, in a two-cycle sequence. The architecture provides for pipelined data manipulation in which, during a first cycle, operand A is multiplied by a fraction of operand B. The least significant bits of the outcome are added to appropriately shifted bits of operand C. During the second cycle, operand A is multiplied with the remaining bits of operand B, added to aligned bits of operand C, and combined with bits from the prior multiplication cycle using one adder and two incrementers. The adder receives a carry from the least significant bit (LSB) incrementer and provides a carry to the most significant bit (MSB) incrementer. The use of two cycles and a LSB incrementer significantly reduces the sizes of both the multiplier array and the full adder.

These and other features of the invention will be more clearly understood and appreciated upon consid-

DESCRIPTION OF THE PREFERRED EMBODIMENT

Figure 1:
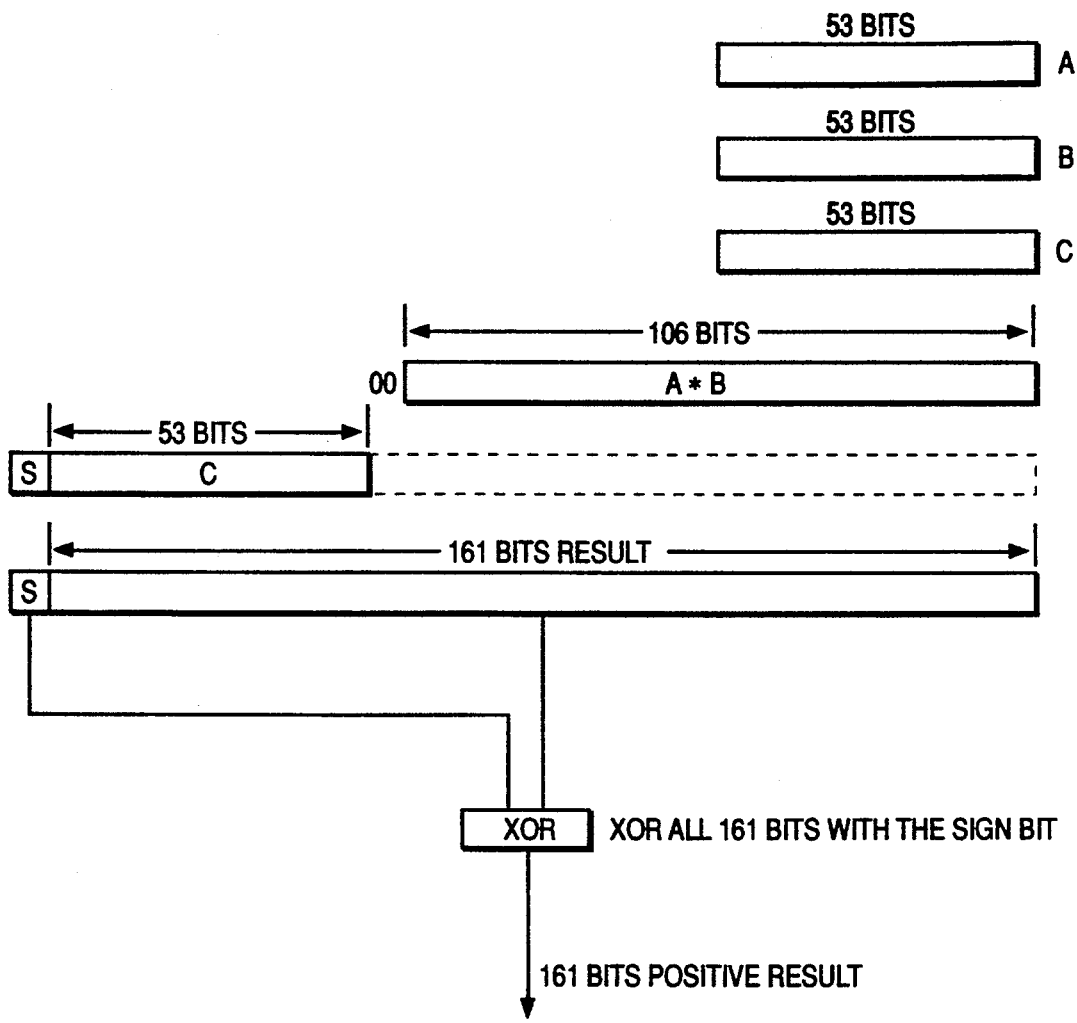
FIG. 1 schematically depicts bit positions of operands in a classic floating point multiplication.

FIG. 1 schematically depicts the classical approach to performing a floating point operation defined by the mathematical relationship the mathematical relationship A*B+C, where A, B and C are individually composed of N bits (N=53). It should be apparent that the mantissa of operand C must be added before the truncation or rounding of the intermediate result A*B. Thus the intermediate result of A*B is composed of 106 bits, including 2 further bit places for carry conditions. Following classical practices, the 53 bits of operand C are added to the 108 bits of the A*B result following alignment of the C mantissa with the A*B mantissa. The alignment range of C is shown by the dashed lines in FIG. 1. Following such alignment, the two values A*B and C are added in a full adder having an output of 161 bits. The S bit at the left represents the sign of the value C, with the sign of the A*B product being handled by separate logic. The XOR is then used to provide the correct 1's complement value from the 161 bit full adder.

Those skilled in the design of electronic circuits for full addition and multiplication, know that full adders are very large and complicated devices. There are clear benefits to be gained if the bit size of the full adder can be reduced. Similarly, a distinct reduction in circuit size can be gained if the Wallace tree multiplier, typically composed of multiple CSAs, can be reduced in bit count.

The earlier noted U.S. Pat. No. 4,969,118 suggests that for the mathematical operation of A*B+C, where operands A, B and C are each N bits, an N bit incrementer can be used in the most significant bit (MSB) position of the full adder to reduce the size of adder from 3N to 2N. A similar approach is discussed in the aforementioned IBM Technical Disclosure Bulletin. The architecture according to the present invention further reducing the size of the full adder by the use of an incrementer to replace operations performed in the least significant bit (LSB) side of the full add, and as an aspect thereof, also reduces the size of Wallace tree multiplier. Central to the refined approach is the partition of the multiplication operation into multiple cycles, and the selective addition of partial products in the multiple cycles using a pipelined architecture.

Figure 2:
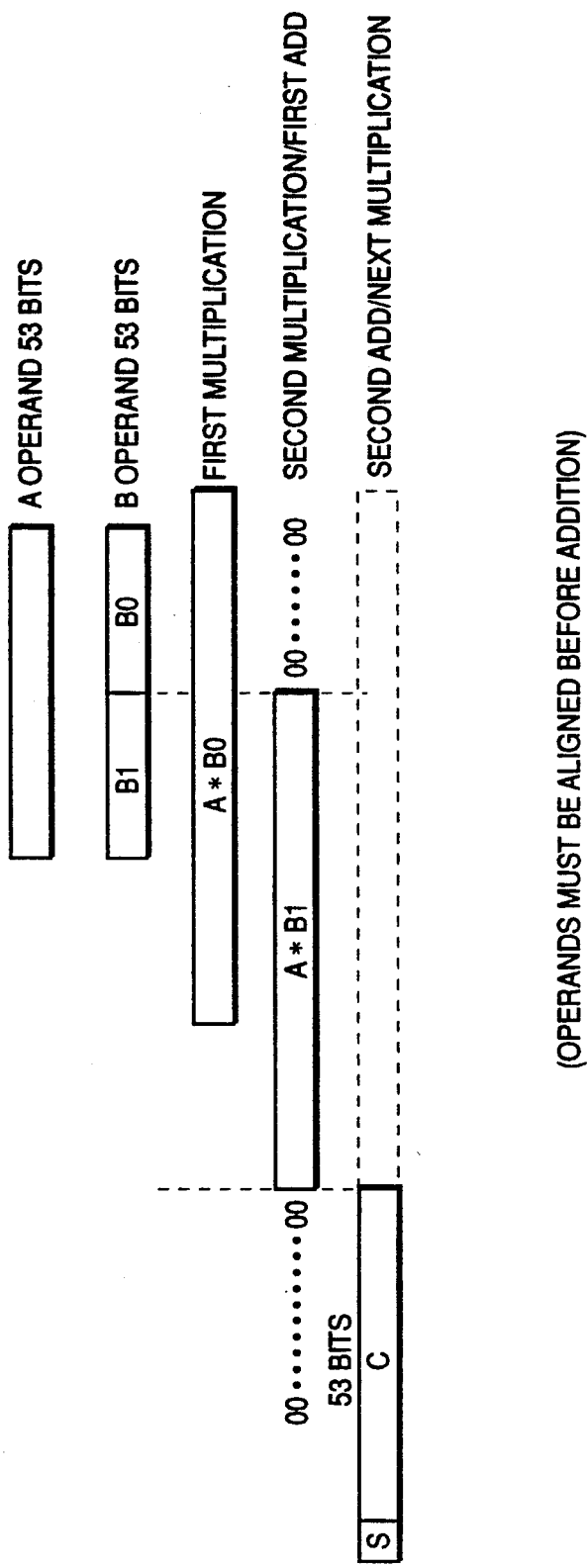
FIG. 2 schematically depicts the orientation of bits according to the practice of the present invention.

FIG. 2 conceptually depicts the operations associated with a preferred implementation of the invention. Again, operands A, B and C are composed of N bits (where N=53), and operand B is divided into M segments in which M is a whole number greater than 1. In the illustration M is equal to 2. In keeping with such implementation, the circuit architecture is partitioned into a pipeline composed of three primary segments, as distinguished by dashed lines in the schematic of FIG. 3. In the context of FIG. 2, a first multiplication is performed involving the operand A and the partial operand B0. The second stage of performing the operation A*B+C involves the multiplication of A with the second, most significant segment, of operand B as represented by B1. However, since the least significant bits of operation of A*B0 are fixed, the value of C as appropriately shifted can also be added into the least significant bit range of the final result. Since these bits of the final result are not directly affected by the outcome of the multiplication A*B1, the second multiplication can be accomplished concurrent with the first addition. The framework for a pipelined architecture is thereby defined.

For the specific example in FIG. 2, the addition of the N/2 least significant bits is accomplished at the same time that the circuit is performing the second multiplication. It should also be apparent that the concept depicted in FIG. 2 can be extended to larger subdivisions of operand B, and the associated pipelined or concurrent multiplication and addition operations of partial results. Unfortunately, the returns diminish as the value of M, the divisor of operand B, increases. For example, for M=2, the full adder must accommodate all the bits of A*B1. In this example the full adder is 2N−N/2 size. However, the adder decreases in size at a diminishing rate as M increases, as defined by the formula 2N−N(M−1)/M.

The use of partial products according the procedure depicted in FIG. 2 has little consequence unless one appreciates that the least significant bits of the addition of A*B0 with the appropriately shifted bits of operand C are not subject to changes as a direct consequence of subsequent multiplications. Therefore, these bits can be manipulated in a device less complex than a full adder.

Another fallout of the operation can be understood upon recognizing that each partial product A*B0 and A*B1 has fewer bits than the product A*B. Namely, a full multiplication of A*B produces a product of 2N bits while the individual products of A*B0 and A*B1 are composed of approximately 1.5N bits. An architecture and sequence of operation of the present form, involving multiple cycles through the same multiplier, has a significant effect on the size of a Wallace tree multiplier. Even though the bit count decreased by 25%, the number of CSA's in the multiplier decreases by approximately 50%. Thus, as another aspect, the present invention provides for a major reduction in the size of the multiplier. As embodied in FIG. 3, the invention employs a Wallace tree with concurrent multiplication and addition resources. Thereby, aligned operand C can be added to appropriate bits of A*B0 distinct from the final addition of A*B1 with the most significant bits of A*B0.

Figure 3:
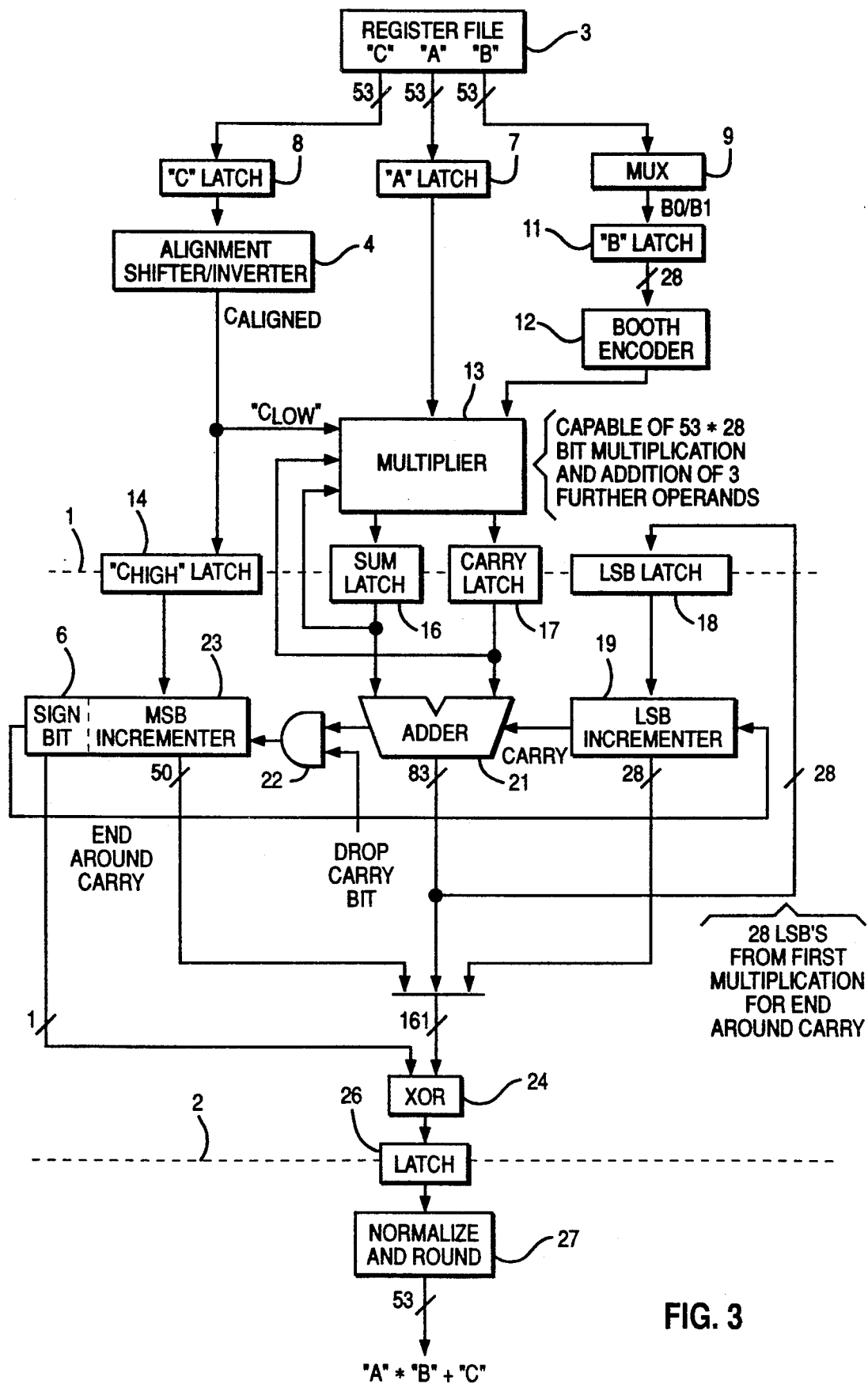
FIG. 3 schematically depicts by block diagram a preferred architecture for the floating point multiplier of the present invention.

The benefits ascribed to multiplication according to the method depicted in FIG. 2 are provided in the circuit architecture of FIG. 3. The architecture is divided into three segments individualized by dashed lines 1 and 2 in FIG. 3. The three segments represent three stages of a pipeline which performs the mathematical operation A*B+C in a nominal two cycle sequence while using significantly smaller circuits to perform the functions of the full adder and multiplier. The mantissas of operands A, B and C are provided by file register 3. The exponents are manipulated elsewhere in fairly well known manner to enable alignment shifter/inverter 4. Similarly, separate logic is used to handle the signs of operands A, B and C in a manner which eventually leads to the appropriate sign in sign bit position 6 of incrementer 23. The term "operand" in the ensuing paragraphs will refer generally to the mantissa of each operands A, B and C, in that the mantissas are the primary subjects of the manipulations being accomplished.

Operands A and C are latched into respective latches 7 and 8 while operand B is split by multiplexer 9 before storage in latch 11. Following such latching the respective value of B0 or B1 are plier 13. Multiplier 13 preferably employs a Wallace tree configuration capable of simultaneously multiplying a 53 bit operand with a 28 bit operand while adding 3 further operands. Wallace trees composed of carry save adders (CSA) are described in the aforementioned U.S. Pat. Nos. 4,969,118 and 4,999,802, and in the text book by Patterson et al. Booth encoding is discussed in the noted text by Patterson et al as well as described in the aforementioned IBM Technical Disclosure Bulletin.

As depicted in FIG. 3, multiplier 13 receives inputs bits representing operand A, encoded bits representing B0 or B1, shift aligned least significant bits from operand C, and sum and carry bits from an immediately preceding cycle. Thus, in the context of the second multiplication accomplished according to the sequence in FIG. 2, multiplier 13 in FIG. 3 receives the appropriately shifted low end bits of operand C, operand A, operand B1, and the sum and carry values of the N/2 least significant bits of the outcome from the previous multiplication involving A*B0. The next stage of the pipeline is isolated by latches 14, 16, 17 and 18 from the stage whose operation was just described. Note that latch 18 stores the results of the full addition of the least significant bits of the first multiplication, namely A*B0, with the appropriately shifted least significant bits of operand C.

The primary function of the second stage of the pipeline depicted in FIG. 3 is to complete the full addition of the intermediate results. With reference to FIG. 2, this means the full addition of A*B1 with the most significant bits of A*B0 as affected by shift aligned bits of operand C. The second stage of the pipeline, as situated between boundary lines 1 and 2, includes LSB incrementer 19, full adder 21, logic gate 22, and MSB incrementer 23, together providing the 161 bit unrounded result to XOR 24. The effects of the sign of operand C are introduced into XOR gate 24 from sign bit location 6. The output of XOR gate 24 is held in latch 26. Note that in contrast to prior practices, full adder 21 provides an output of only 83 bits. The classical approach requires greater than 106 bits. Accordingly, the size of adder 21 is reduced significantly. LSB incrementer 19 manipulates the 28 least significant bits of the 161 bit result. The 50 most significant bits of the result are manipulated by MSB incrementer 23. Further note that LSB incrementer 19 provides a carry to adder 21, which adder itself provides a selective carry, via gate 22, to MSB incrementer 23, which incrementer then closes the loop by providing an end around carry to the input of LSB incrementer 19.

The use of LSB incrementer 19 to handle the N/2 least significant bits arose from the recognition that data manipulation according to the present architecture involves only a single carry bit at the input to the least significant bit position of the composite 161 bit output.

EXAMPLE #1

| Decimal | Binary | |
|---|---|---|
| 6 | 000110 | |
| 10 | 001010 | |
| 11 | 001011 | |
| −6 | 111001 | 1's complement |
| −11 | 110100 | 1's complement |

└──Sign Position

| 001010 | 10 | { No carry value to add. |
| 000110 | 6 | { Final sign is + so |
| | | no inversion. |
| 0010000 | 16 | |

│ │
  │ └──┐
  │    │
Carry   │
Position Sign Position

| 001010 | 10 | |
| 111001 | −6 | |
| 1000011 | | {Carry value added back |
| | | to LSB position. |
| | | {Final sign is + so |
| | | no inversion |
| └─>1 | | |
| 000100 | 4 | |

| 001010 | 10 | |
| 110100 | −11 | |
| 0111110 | | {No carry value to add |
| 000001 | − 1 | {Final sign is −, |
| | | requiring inversion to |
| | | get the magnitude. |

Example #1 shows a 1's complement manipulation of the decimal values 6, 10, 11, −6 and −11 in binary form. 1's complement addition of selected numbers as appears in Example #1 illustrates that the circuitry must include the ability to provide an end around carry from the most significant bit position to the least significant bit position. See the example addition of 10 with −6.

The purpose of gate 22 is to selectively delete carry bits propagating from adder 21 to MSB incrementer 23. Carry bits are selectively deleted when the C operand is shifted so that the bits align with the sign position in the partial products from the Wallace tree multiplier. The constraints for dropping a carry bit are defined by the three examples which follow.

EXAMPLE #2

| 11000 | Three inputs to CSA |
| 110 | of Wallace tree in multiplier. |
| 10 | |
| | |
| 11100 | Sum of three inputs-first of |
| | two outputs from CSA. |
| | |
| 000100 | Carry output-second of |
| | two outputs from CSA. |

```
               -continued
011X00000      C₁ operand value (aligned).

011 11000      Sum of three inputs to CSA
               of Wallace tree in multiplier -
               1st output of CSA.

000 01000      Carry output - 2nd output of CSA.

011 00000      Sum from full adder.
```

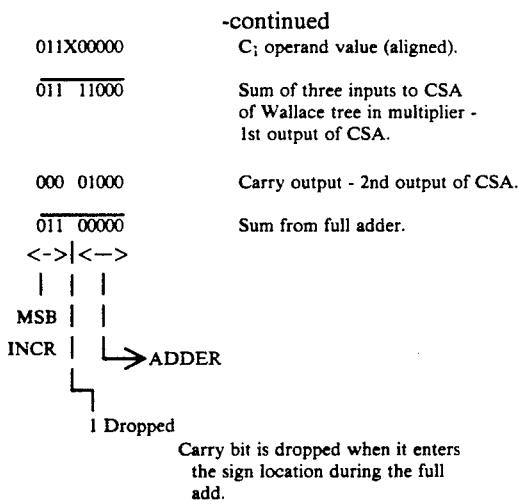

Carry bit is dropped when it enters
the sign location during the full
add.

In the example identified as #2, the Wallace tree multiplier, composed of carry save adders, combines three inputs to provide a sum output and a carry output, the result of which is then further added in a successive stage of the Wallace tree multiplier to an aligned value of the C operand ($C_1$). The X symbol identifies a bit position omitted from C because it aligns with the sign position of the multiplied values. The output of the Wallace tree is composed of sum and carry binary bits, which themselves are the two inputs to a full adder. Note that the result of the full adder would propagate a "1" bit into the sign bit position. According to the present invention gate 22 is disabled to delete such carry bit before it propagates into the MSB incrementer.

EXAMPLE #3

```
11100       {
000100      { From Example #2

011X10000   C₁ operand value (aligned).
011 01000   Sum of three inputs to CSA of
            Wallace tree in multiplier -
            1st output of CSA.

000 01000   Carry output-2nd output of CSA.
011 10000   Sum from full adder.
```

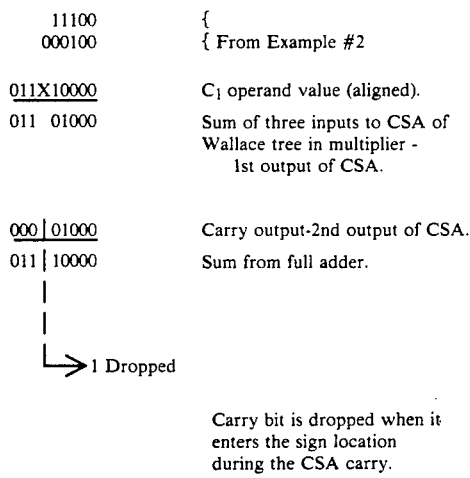

Carry bit is dropped when it
enters the sign location
during the CSA carry.

A similar situation exists for the example identified as #3. In this case a $C_2$ operand value is added. Again, the carry bit is dropped when it enters the sign location, but now this occurs during addition preceding the full add cycle.

EXAMPLE #4

```
11100     { From Example #2
000100    {
```

```
             -continued
00X11110     C₃ operand value (aligned).
00  00110    Sum . . .
00 11100     Carry . . .
01 00010
```

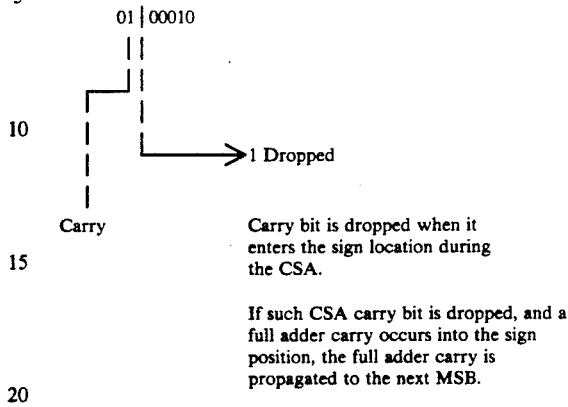

Carry    Carry bit is dropped when it
         enters the sign location during
         the CSA.

If such CSA carry bit is dropped, and a
full adder carry occurs into the sign
position, the full adder carry is
propagated to the next MSB.

The example identified as #4 illustrates addition with a $C_3$ operand value during which gate 22 propagates a carry from adder 21 to MSB incrementer 23. In this situation, the carry bit resulting from the operation preceding the full add is again dropped, but when followed by a second carry during the full add, such second carry is propagated to the next most significant bit. In this way, the carry generated in adder 21 is conveyed only when appropriate to increment the C value as previously entered into MSB incrementer 23.

In keeping with the architecture define in FIG. 3, the 161 bit result held in latch 26 is normalized and rounded in block 27 following relatively conventional practices and before being provided as a 53 bit output equal to the mathematical operation defined as $A*B+C$.

It should be apparent from the description that the pipelined architecture provides for concurrence of operations in a manner which optimizes the incremental multiplication of $A*B$. Partitioned multiplication and time interleaved addition allow the use of a smaller multiplier and an incrementer to replace a large number of the least significant bits of the full adder. Finally, the invention includes resources for selectively deleting carry bits, which bits would otherwise propagate from the full adder into the most significant bit incrementer when conditions dictate that the propagation is not appropriate.

Although the invention has been described illustrated by way of a specific embodiment, the apparatus and methods encompassed by the invention should be interpreted consistent with the breath of the claims set forth hereinafter.

We claim:

1. An electronic apparatus for performing a floating point arithmetic operation $(A*B+C)$ using mantissas where the mantissas are composed of N bits, comprising:

means for generating a first partial product using A and N/M (M is a whole number >1) of the least significant bits of B;

means for generating a second partial product using A and the next N/M bits of B;

means for summing C with the first partial product and providing selected bits from a sum produced by the means for summing to a first electronic incrementer, the first incrementer receiving the $$\frac{N(M-1)}{M}$$

least significant bits of the selected bits; and means for summing selected most significant bits from the first partial product with selected most significant bits from the second partial product in a $$2N - \frac{N(M-1)}{M}$$

bit adder.

2. The apparatus recited in claim 1, wherein the means for summing selected most significant bits provides carry bits as inputs to a second electronic incrementer and receives carry bit outputs from the first incrementer.

3. The apparatus recited in claim 1, wherein the means for summing C with the first partial product operates in concurrence with the means for generating the second partial product.

4. The apparatus recited in claim 3, wherein M=2.

5. The apparatus recited in claim 4, wherein the means for summing selected most significant bits is a carry look ahead adder.

6. The apparatus recited in claim 5, further including:
means for selectively inhibiting the transmission of carry bits provided as inputs to the second incrementer.

7. A method for electronically performing a floating point arithmetic operation (A*B+C) using mantissas wherein the mantissas are composed of N bits, comprising the steps of:
generating a first partial product in a multiplier using A and N/M (M is a whole number >1) of the least significant bits of B;
generating a second partial product in the multiplier using A and the next N/M bits of B;
summing C with the first partial product in an adding means and providing selected bits from a sum produced by the adding means to a first electronic incrementer receiving the $$\frac{N(M-1)}{M}$$

least significant bits of the selected bits; and summing selected most significant bits form the first partial product with selected most significant bits from the second partial product in a $$2N - \frac{N(M-1)}{M}$$

bit adder.

8. The method recited in claim 7, including the further steps of:
transferring carry bits from an output of the first incrementer to an input of the adder, and
transferring carry bits from an output of the adder to an input of a second electronic incrementer.

9. The method recited in claim 8, wherein the two summing steps are accomplished in a two stage sequence with M=2.

10. The method recited in claim 9, wherein the adder performs a carry look head add operation.

11. The method recited in claim 10, further including the step of selectively removing carry bits from data transferred from the adder to the second incrementer.

12. The apparatus recited in claim 7, wherein the step of summing C with the first partial product and the step of generating a second partial product are accomplished in substantial concurrence.

13. An electronic apparatus for performing a floating point arithmetic operation (A*B+C) to produce a resultant mantissa using the mantissas of A, B and C, comprising:
means for generating a first partial product using A and a first least significant bit portion of B;
means for generating a second partial product using A and the next least significant bit portion of B;
means for summing C with the first partial product and providing a portion of a sum produced by the means for summing to a first electronic incrementer for forming a least significant bit portion of the resultant mantissa; and
means for summing portions of the first partial product and the second partial product to form a remaining portion of the resultant mantissa.

* * * * *